(12) United States Patent
Matsushita et al.

(10) Patent No.: US 10,976,541 B2
(45) Date of Patent: Apr. 13, 2021

(54) SCANNING OPTICAL DEVICE AND IMAGE FORMING APPARATUS

(71) Applicant: CANON KABUSHIKI KAISHA, Tokyo (JP)

(72) Inventors: Naoki Matsushita, Suntou-gun (JP); Fumihiko Yamaya, Mishima (JP); Yoshihiko Tanaka, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 129 days.

(21) Appl. No.: 16/135,940

(22) Filed: Sep. 19, 2018

(65) Prior Publication Data
US 2019/0094529 A1 Mar. 28, 2019

(30) Foreign Application Priority Data
Sep. 26, 2017 (JP) .............................. JP2017-184728

(51) Int. Cl.
*G02B 26/08* (2006.01)
*G02B 26/10* (2006.01)
*G02B 26/12* (2006.01)

(52) U.S. Cl.
CPC ......... *G02B 26/122* (2013.01); *G02B 26/105* (2013.01); *G02B 26/124* (2013.01)

(58) Field of Classification Search
CPC ...... G02B 26/10; G02B 26/12; G02B 26/105; G02B 26/122–127; G03G 15/04; G03G 15/043; G03G 15/0409; G03G 15/0435; H04N 1/113; B41J 2/47
See application file for complete search history.

(56) References Cited

U.S. PATENT DOCUMENTS

2016/0216632 A1* 7/2016 Ishidate ............... G02B 26/123
2017/0010559 A1* 1/2017 Kojima ............. G03G 15/0409

FOREIGN PATENT DOCUMENTS

JP 11-183829 A 7/1999

* cited by examiner

*Primary Examiner* — Mustak Choudhury
(74) *Attorney, Agent, or Firm* — Canon U.S.A., Inc. I.P. Division

(57) ABSTRACT

A scanning optical device includes a light source device, a rotational polygon mirror, a rotor which rotates together with the rotational polygon mirror, a stator which rotates the rotor, wherein a substrate for holding the stator includes a first regulation portion arranged so as to overlap with a portion of the rotor in a rotational axis direction of the rotor, and in a case where the rotor is caused to move in the rotational axis direction, the first regulation portion comes into contact with the rotor, and a second regulation portion is arranged in a position in relation with the first regulation portion so as to maintain the first regulation portion in a position where the first regulation portion overlaps with the portion of the rotor in the rotational axis direction, so as to regulate deformation of the first regulation portion.

12 Claims, 10 Drawing Sheets

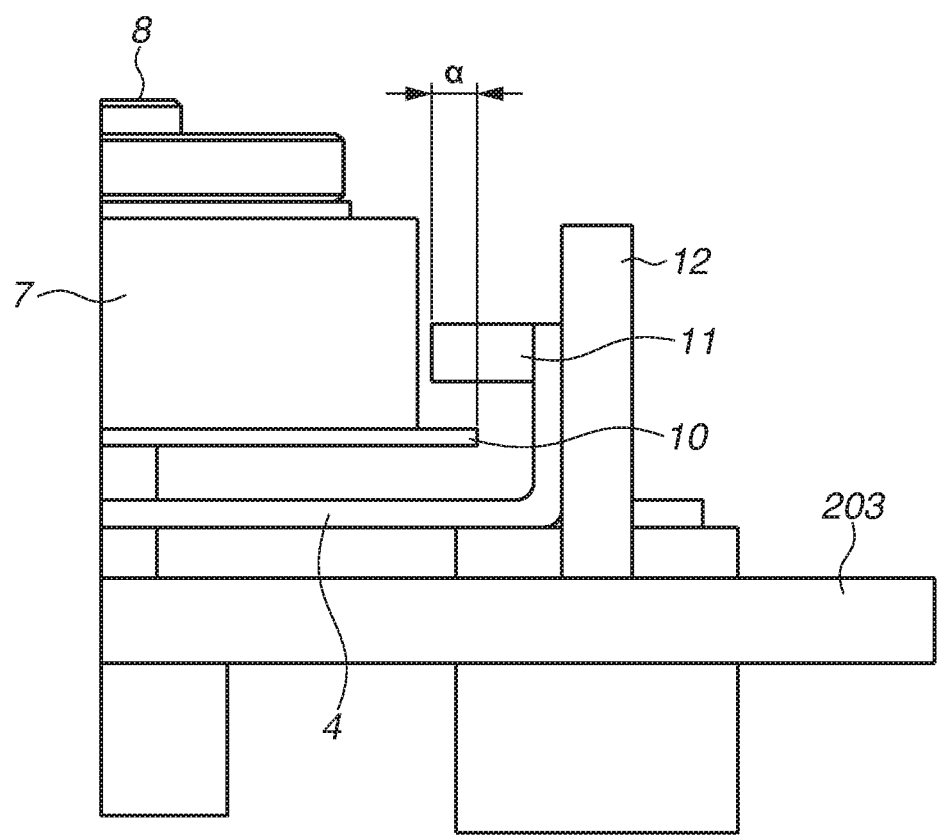

SCANNING OPTICAL DEVICE AND IMAGE FORMING APPARATUS

BACKGROUND OF THE INVENTION

Field of the Invention

The present disclosure generally relates to image forming and more specifically relates to a scanning optical device which deflects laser light to execute scanning operation. Further, the present disclosure relates to an image forming apparatus such as an electrophotographic copying machine or an electrophotographic printer including the scanning optical device.

Description of the Related Art

A conventional scanning optical device used for an image forming apparatus deflects laser light emitted from a light source to execute scanning operation according to an image signal using a light deflection device having a rotational polygon mirror. The laser light deflected for the scanning operation is condensed by a scanning lens such as an fθ lens to form an electrostatic latent image on a photosensitive drum.

FIG. 10 is a diagram illustrating a configuration of a conventional light deflection device 302 discussed in Japanese Patent Application Laid-Open No. 11-183829. As illustrated in FIG. 10, the conventional light deflection device 302 is configured of a rotational polygon mirror 301, a rotor 303, a shaft 304 integrated with the rotor 303, a bearing shaft sleeve integrated with a substrate 305 (not illustrated), and a stator (not illustrated).

Herein, the bearing shaft sleeve (not illustrated) is configured not to regulate slipping of the rotor 303 in its rotational axis direction. Therefore, if the rotor 303 receives force in the rotational axis direction, there is a risk that the rotor 303 may slip from the bearing shaft sleeve. Therefore, in order to regulate the slipping of the rotor 303, a stopper 307 that overlaps with a flange portion 306 of the rotor 303 is provided by bending the substrate 305.

In recent years, because a scanning optical device or a light deflection device has been reduced in size and weight, there is a risk of a fall from a high place at the time of distribution. Thus, a load applied to the scanning optical device or the light deflection device has been increased.

In a configuration discussed in Japanese Patent Application Laid-Open No. 11-183829, in a case where a heavy load in a rotational axis direction is applied to the rotor 303, the rotor 303 is moved in the rotational axis direction and is brought into contact with the stopper 307 for regulating the slipping of the rotor 303. At this time, if a large impact load is applied thereto, the stopper 307 may be deformed to cause the rotor 303 to pass over the stopper 307 and slip out of the bearing shaft sleeve.

SUMMARY OF THE INVENTION

Therefore, the present disclosure is directed to a scanning optical device in which the risk of slipping of the rotor in a rotational axis direction can be reduced more than in a conventional configuration.

According to an aspect of the present disclosure, a scanning optical device includes a light source device, a rotational polygon mirror which rotates to deflect laser light emitted from the light source device, a rotor which holds the rotational polygon mirror and rotates together with the rotational polygon mirror, a stator which rotates the rotor, wherein a substrate for holding the stator includes a first regulation portion arranged so as to overlap with a portion of the rotor in a rotational axis direction of the rotor, and in a case where the rotor is caused to move in the rotational axis direction, the first regulation portion comes into contact with the rotor, and wherein a second regulation portion is arranged in a position in relation with the first regulation portion so as to maintain the first regulation portion in a position where the first regulation portion overlaps with the portion of the rotor in the rotational axis direction, so as to regulate deformation of the first regulation portion.

Further features of the present disclosure will become apparent from the following description of exemplary embodiments with reference to the attached drawings.

BRIEF DESCRIPTION OF THE DRAWINGS

FIG. 7 is an enlarged diagram of the stopper having a configuration in which the stopper is previously in contact with a deformation regulation portion.

DESCRIPTION OF THE EMBODIMENTS

<Image Forming Apparatus>

Hereinafter, a general configuration of an image forming apparatus A including a scanning optical device according to a first exemplary embodiment of the present disclosure and an image forming operation thereof will be described with reference to the appended drawings.

Figure 1:
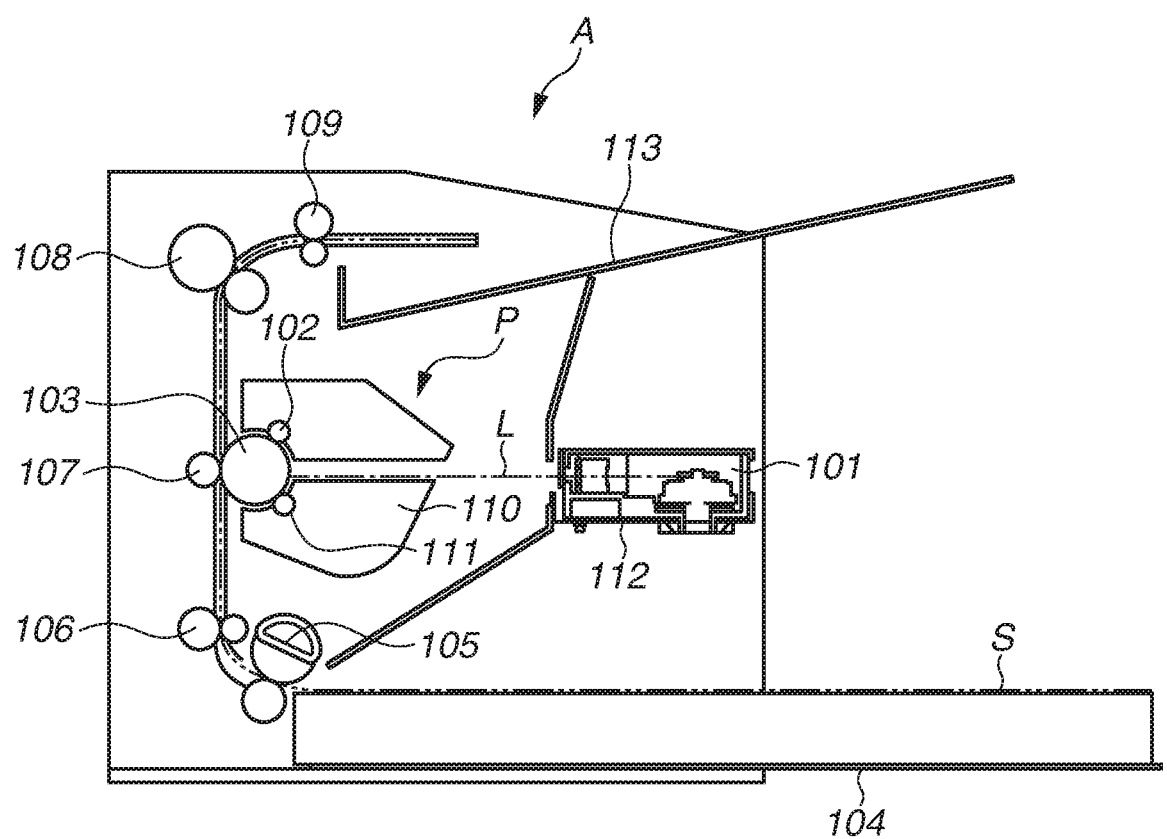
FIG. 1 is a schematic cross-sectional diagram of an image forming apparatus.

As illustrated in FIG. 1, the image forming apparatus A includes an image forming unit for transferring a toner image onto a sheet such as paper, a sheet feeding unit for supplying a sheet to the image forming unit, and a fixing unit for fixing a toner image on a sheet such as paper.

The image forming unit includes a process cartridge detachably attached to a main body of the image forming apparatus A, a scanning optical device 101, and a transfer roller 107. Further, the process cartridge P includes a rotatable photosensitive drum 103 (image bearing member), a charging roller 102, and a development device 110. Further, an optical platform 112 as a part of a housing of the image forming apparatus A is arranged on an opposite side of the process cartridge P, and the scanning optical device 101 is arranged on the optical platform 112.

When image forming processing is to be executed, a control unit (not illustrated) receives an image forming job signal to cause a feeding roller 105 and a conveyance roller 106 to feed a sheet S stacked and stored in a sheet stacking unit 104 to the image forming unit.

On the other hand, in the image forming unit, bias is applied to the charging roller 102, so that a surface of the photosensitive drum 103 that is in contact with the charging roller 102 is charged thereby. Thereafter, the scanning optical device 101 emits laser light L from a light source device 201 (see FIG. 2), and irradiates the photosensitive drum 103 as an image bearing member with the laser light L according to image information. With this processing, potential of the photosensitive drum 103 is partially lowered, so that an electrostatic latent image according to the image information is formed on a surface of the photosensitive drum 103.

Thereafter, bias is applied to a development sleeve 111 arranged on the development device 110, so that toner supplied from the development sleeve 111 is adhered to the electrostatic latent image formed on the surface of the photosensitive drum 103 as an image bearing member, and a toner image is formed thereon.

Subsequently, the toner image formed on the surface of the photosensitive drum 103 as an image bearing member is conveyed to a transfer nip portion formed at a position between the photosensitive drum 103 and the transfer roller 107. When the toner image reaches the transfer nip portion, bias having a charging polarity opposite to a charging polarity of the toner is applied to the transfer roller 107, so that the toner image is transferred to the sheet S.

Thereafter, the sheet S onto which the toner image is transferred is conveyed to the fixing device 108 and heated and pressurized at a fixing nip portion formed at a position between a heating unit and a pressurize unit of the fixing device 108, so that the toner image is fixed on the sheet S. Then, the sheet S is discharged to a discharge tray 113 by a discharge roller 109.

<Scanning Optical Device>

Figure 2:
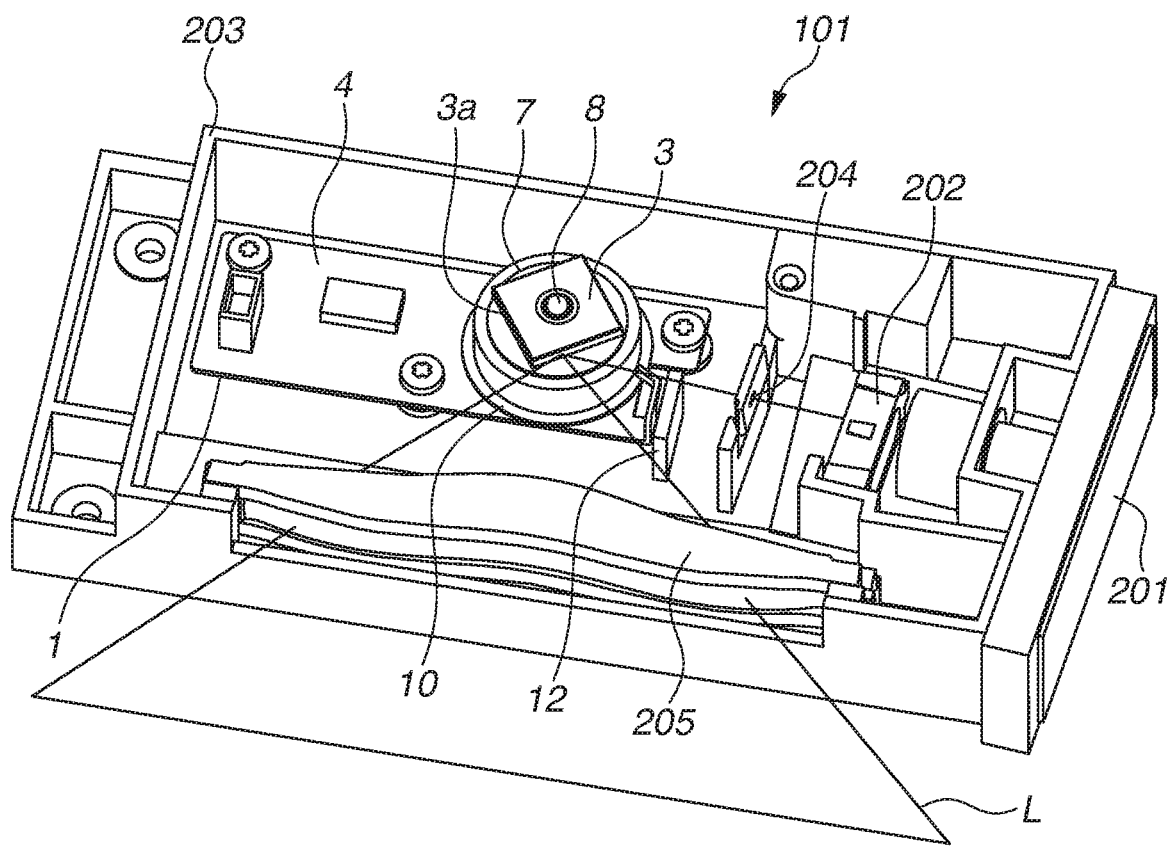
FIG. 2 is a perspective diagram of a scanning optical device.

Next, a configuration of the scanning optical device 101 will be described. FIG. 2 is a perspective diagram of the scanning optical device 101. As illustrated in FIG. 2, the scanning optical device 101 includes the light source device 201 internally including a semiconductor laser and a cylindrical lens 202. The scanning optical device 101 further includes an aperture diaphragm 204, a light deflection device 1 having a rotational polygon mirror 3, and an fθ lens 205.

These optical members are housed in a housing 203. Further, from a point of dust prevention, an opening on the upper side of the housing 203 is covered by an optical lid (not illustrated) made of metal or resin.

A basic operation of the scanning optical device 101 will be described. When the laser light L is emitted from the light source device 201, the laser light L is condensed only in the sub-scanning direction orthogonal to the rotation axis direction of the photosensitive drum 103 by the cylindrical lens 202.

The laser light L passes through the aperture diaphragm 204, such that a light flux width thereof is limited to a predetermined width. Thereafter, the laser light L forms an image on a reflection face 3a of the rotational polygon mirror 3. Then, the light deflection device 1 rotates the rotational polygon mirror 3 to deflect the laser light L which is reflected on the reflection face 3a to execute scanning operation.

The rotational polygon mirror 3 deflects the laser light L in the scanning direction, so that the laser light L enters the fθ lens 205. The fθ lens 205 is a lens for causing the laser light L to form an image on the photosensitive drum 103. The fθ lens 205 is designed to condense the laser light L to form a spot on the photosensitive drum 103 while maintaining a scanning speed of the spot at a constant speed. The laser light L passing through the fθ lens 205 forms an image on the photosensitive drum 103.

Thereafter, through the rotation of the rotational polygon mirror 3, the photosensitive drum 103 is scanned with the laser light L in a main scanning direction (a rotational axis direction of the photosensitive drum 103). Further, the photosensitive drum 103 is driven rotationally and scanned with the laser light L in a sub-scanning direction. Through the above-described processing, an electrostatic latent image is formed on the surface of the photosensitive drum 103.

<Light Deflection Device>

Figure 3:
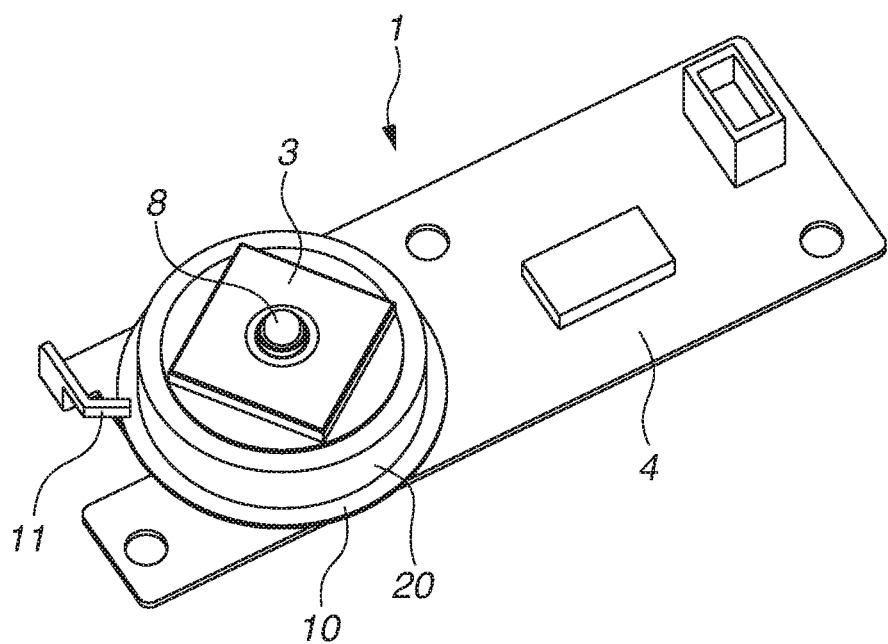
FIG. 3 is a cross-sectional diagram of a light deflection device.
Figure 4:
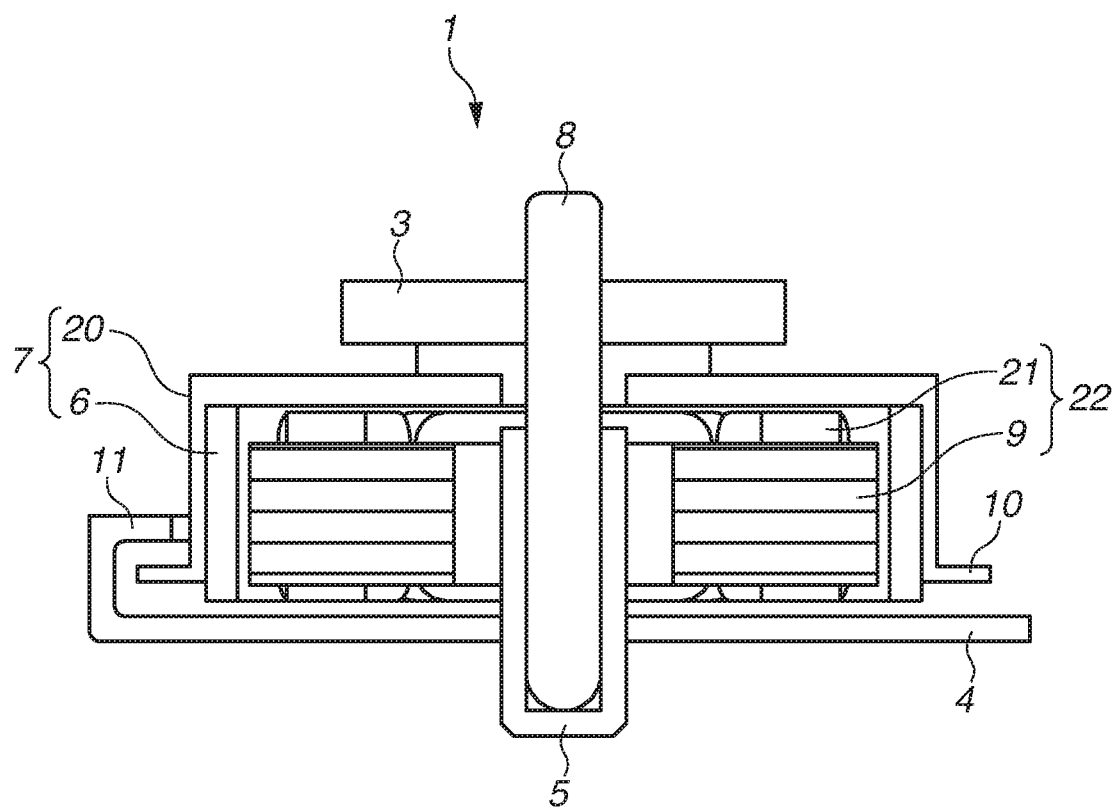
FIG. 4 is a cross-sectional diagram of the light deflection device.

Next, a configuration of the light deflection device 1 will be described. FIG. 3 is a perspective diagram of the light deflection device 1. FIG. 4 is a cross-sectional diagram of the light deflection device 1. As illustrated in FIGS. 3 and 4, the light deflection device 1 includes a substrate 4 configured of a metallic plate and a stator 22 configured of a stator core 9 and a stator coil 21 fixed and held on the substrate 4. The light deflection device 1 further includes a rotor 7 configured of a rotor magnet 6 and a rotor frame 20 having a flange portion 10 formed on a lower portion thereof. The light deflection device 1 also includes the rotational polygon mirror 3 held by the rotor 7. Further, the light deflection device 1 includes a shaft 8 configured integrally with the rotor 7 and a bearing shaft sleeve 5 supported by the substrate 4 which supports the shaft 8 rotatably. Furthermore, in order to regulate slipping of the rotor 7 in the rotational axis direction, the substrate 4 is bent upward and formed into a stopper 11 that serves as a first regulation portion. In addition, the shaft 8 is freely fit into the bearing shaft sleeve 5 at an end portion (shaft end portion) which is on a side opposite to a moving direction of the rotor 7 when the stopper 11 regulates the slipping of the rotor 7.

In a driving period, when electric current is supplied to the stator coil 21, electromagnetic power is generated at a position between the stator coil 21 and the rotor magnet 6, so that the rotor 7 is rotated around the shaft 8 as a rotational axis. As described above, when the rotor 7 is rotated, the rotational polygon mirror 3 and the shaft 8 are rotated together with the rotor 7.

<Stopper Portion>

Figure 5A:
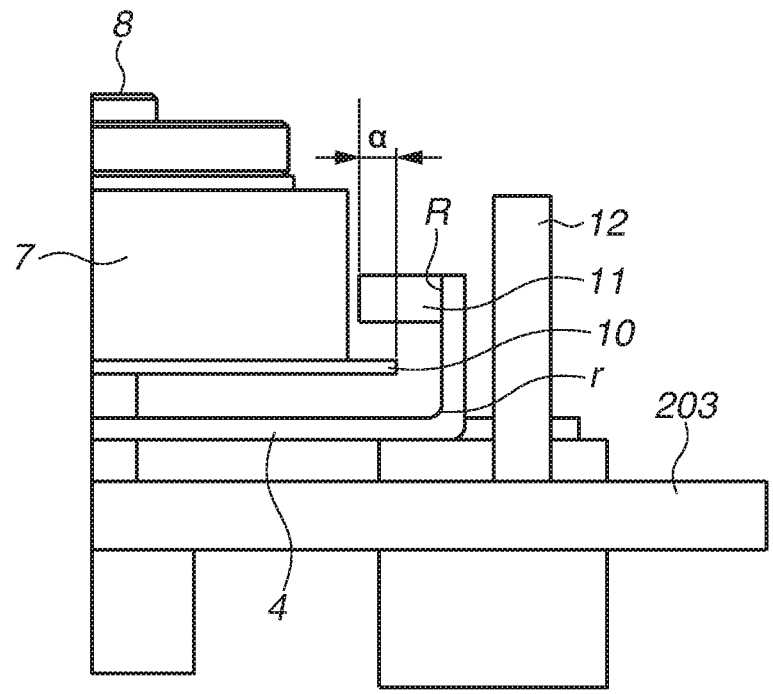
FIGS. 5A and 5B are enlarged diagrams of a stopper.
Figure 5B:
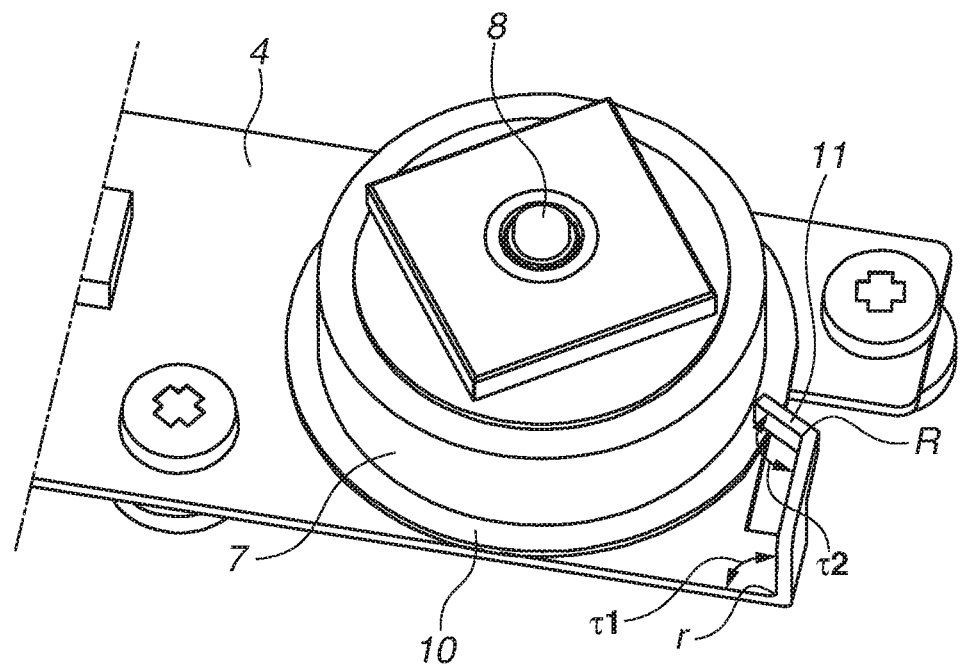

A configuration of the stopper 11 as the first regulation portion will be described in detail. FIGS. 5A and 5B are enlarged diagrams of the stopper 11. As illustrated in FIGS. 5A and 5B, the stopper 11 is formed being bent at two places, i.e., a first bending portion r at which the substrate 4 is bent at substantially 90-degree and a second bending portion R at which the substrate 4 is further bent from the first bending portion r. A bending angle $\tau 2$ of the second bending portion R is smaller than a bending angle $\tau 1$ of the first bending portion r. Further, the first bending portion r is bent in such a state that the second bending portion R is arranged on the opposite side of the substrate 4 with respect to the flange portion 10 of the rotor 7 when viewed in the rotational axis direction of the rotor 7. As described above, the stopper 11 formed of the bent substrate 4 is arranged at a position where the stopper 11 overlaps with the flange portion 10 of the rotor 7 by an overlapping amount $\alpha$ in the rotational axis direction of the rotor 7. In other words, a positional relationship is such that a part of the rotor 7 is arranged at a position between the substrates 4 when viewed in the rotational axis direction of the rotor 7. The stopper 11 is brought into contact with the rotor 7 to regulate the movement when the rotor 7 is moved in the rotational axis direction, so that the slipping of the rotor 7 in the rotational axis direction is regulated.

When the flange portion 10 of the rotor 7 is in contact with the stopper 11, a load is applied in the rotational axis direction of the rotor 7 to the stopper 11 serving as the first regulation portion. This load is applied at a position closer to the second bending portion R than to the first bending portion r of the stopper 11. Because of the position where the above load is applied and the bending angle, in a case where the flange portion 10 is in contact with the stopper 11, although a portion ranging from a leading end to the second bending portion R of the stopper 11 is hardly deformed, deformation arises in a direction orthogonal to the rotational axis direction of the rotor 7 at a portion ranging from the second bending portion R to the first bending portion r.

Therefore, in order to make the stopper 11 function, it is necessary to regulate deformation of the stopper 11 to maintain a state where the stopper 11 and the flange portion 10 are arranged at a position where the stopper 11 and the flange portion 10 overlap with each other in a rotational axis direction of the rotor 7. In other words, deformation of the stopper 11 has to be regulated in order to maintain the overlapping amount α to an amount at least greater than "0".

Therefore, a deformation regulation portion 12 for regulating deformation of the stopper 11 (second regulation portion) that is in contact with the stopper 11, is arranged on the housing 203 to maintain a state where the stopper 11 and the flange portion 10 of the rotor 7 are arranged at a position where the stopper 11 and the flange portion 10 overlap in a rotational axis direction of the rotor 7 (also see FIG. 2). With respect to the stopper 11, the deformation regulation portion 12 serving as the second regulation portion is arranged on a side opposite to the side on which the shaft 8 as a rotational axis of the rotor 7 is arranged. Further, in order to easily bring the deformation regulation portion 12 into contact with the stopper 11 as the first regulation portion, a height of the deformation regulation portion 12 as the second regulation portion is set greater a height of the stopper 11.

Figure 6:
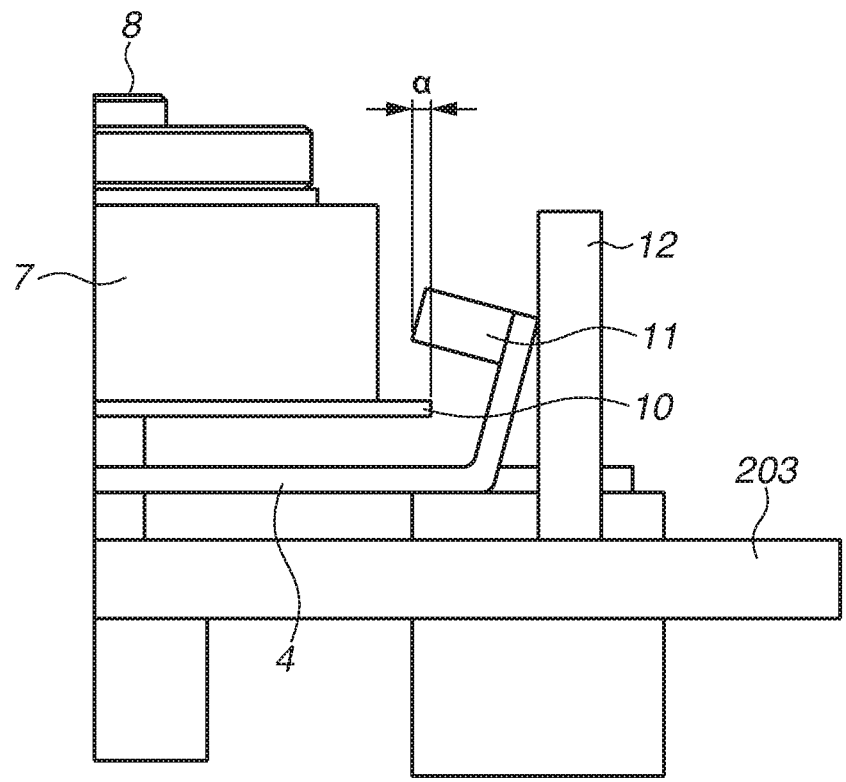
FIG. 6 is an enlarged diagram of the stopper illustrating a state where the stopper is deformed.

With this configuration, as illustrated in FIG. 6, even if the stopper 11 is deformed, the stopper 11 is in contact with the deformation regulation portion 12, so that deformation thereof is regulated. Therefore, a state is maintained where the stopper 11 and the flange portion 10 are arranged at a position where the stopper 11 and the flange portion 10 overlap in the rotational axis direction of the rotor 7. In other words, in a state where the stopper 11 is in contact with the deformation regulation portion 12, the rotor 7 and the stopper 11 are arranged at a position where the rotor 7 and the stopper 11 overlap in the rotational axis direction of the rotor 7. Accordingly, the slipping of the rotor 7 in the rotational axis direction can be suppressed further than in the conventional configuration.

Further, as illustrated in FIG. 7, the deformation regulation portion 12 may be arranged to be previously in contact with the stopper 11. With this configuration, similar to the above-described configuration, deformation of the stopper 11 is regulated, so that the slipping of the rotor 7 is suppressed.

Figure 8A:
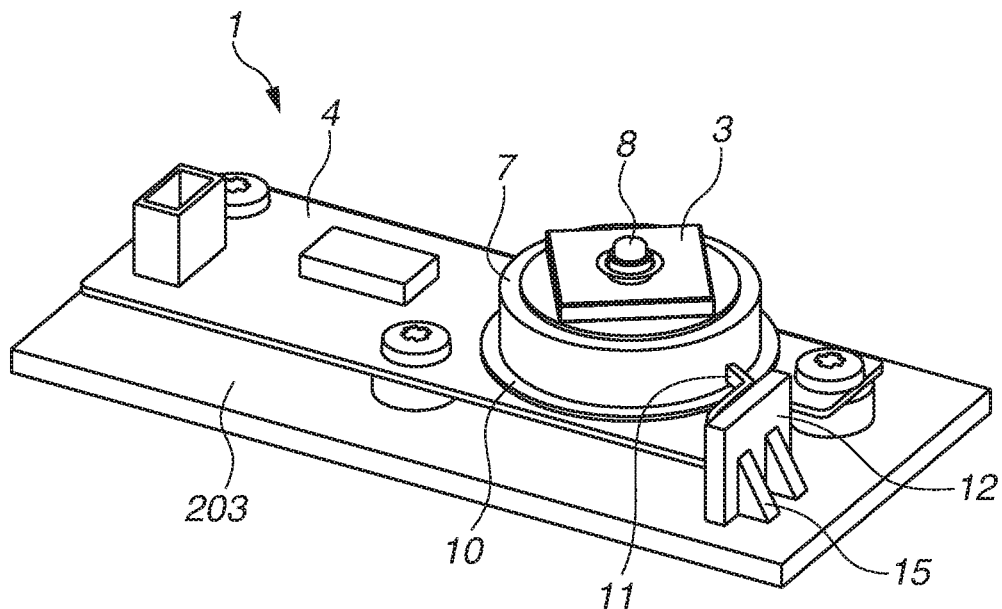
FIGS. 8A and 8B are perspective diagrams of light deflection device in different configurations.
Figure 8B:
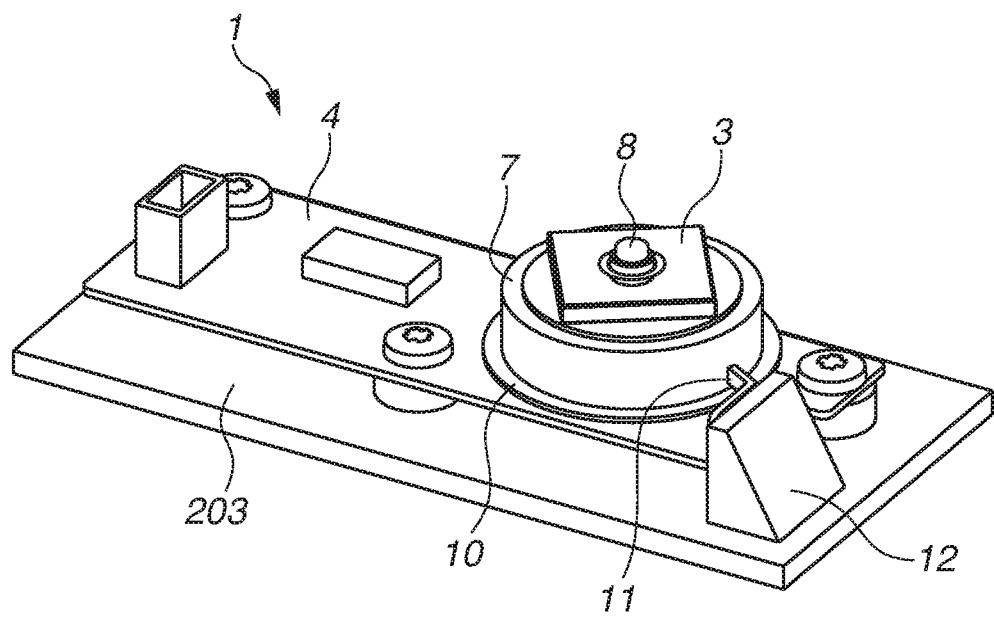

Further, as illustrated in FIG. 8A, in order to enhance a load bearing strength of the deformation regulation portion 12 in a direction orthogonal to the rotational axis direction of the rotor 7, a rib 15 for reinforcing the deformation regulation portion 12 may be arranged thereon. Further, as illustrated in FIG. 8B, the deformation regulation portion 12 may be formed into a trapezoidal shape. With this configuration, deformation of the deformation regulation portion 12 can be suppressed, so that an effect of regulating the deformation of the stopper 11 can be improved.

Next, a configuration of an image forming apparatus A including a scanning optical device according to a second exemplary embodiment of the present disclosure will be described. The same drawings and the same reference numerals are applied to portions overlapping with portions described in the first exemplary embodiment, and description thereof will be omitted.

Figure 9:
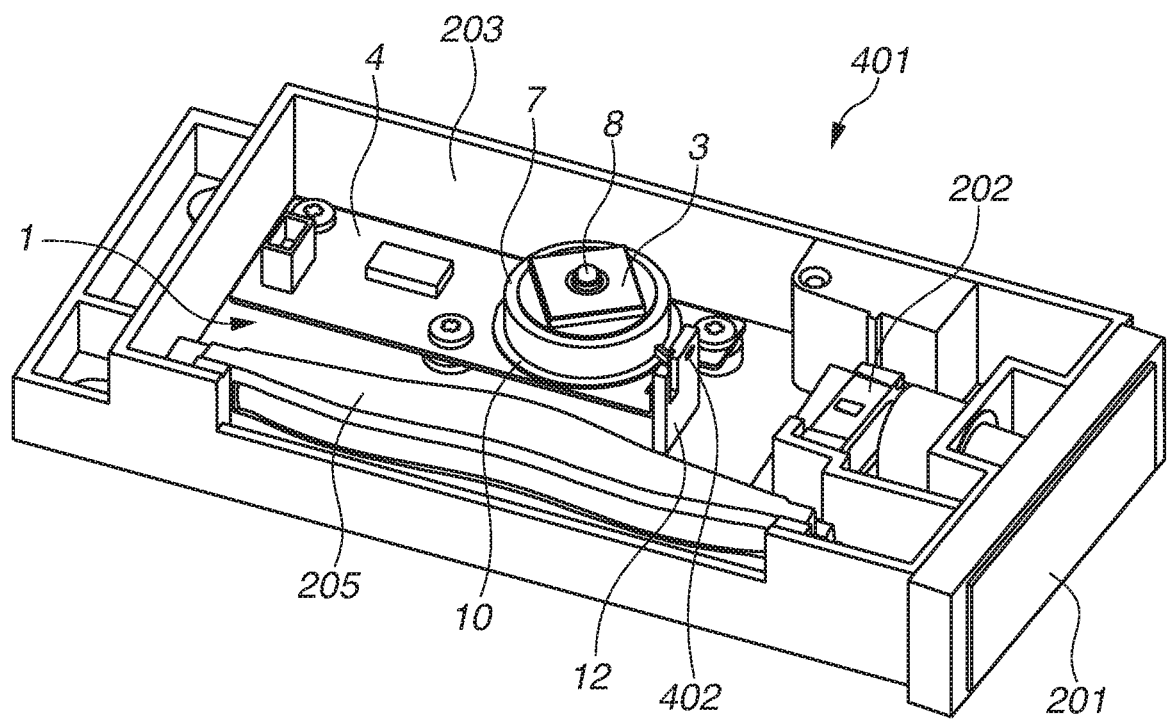
FIG. 9 is a perspective diagram of the scanning optical device.
Figure 10:
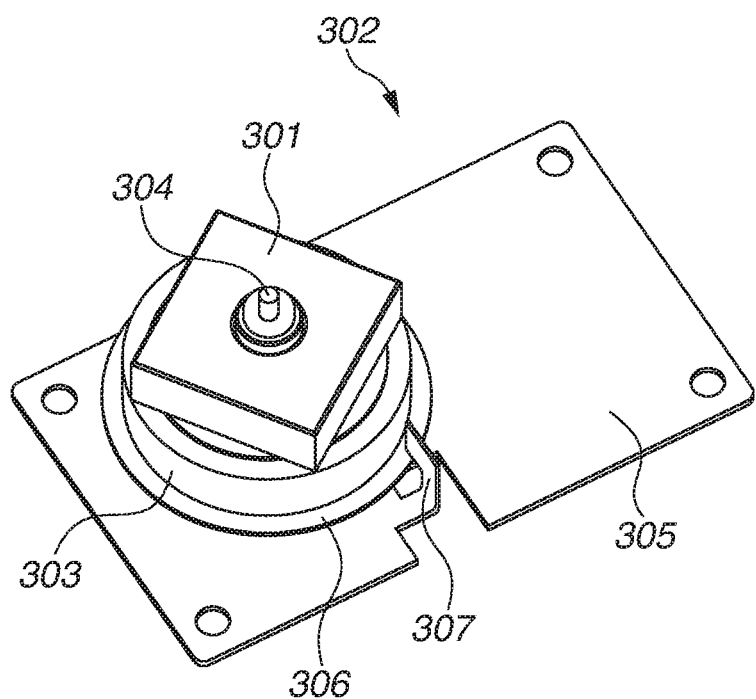
FIG. 10 is a perspective diagram illustrating a configuration of a conventional light deflection device.

FIG. 9 is a perspective diagram of a scanning optical device 401 according to the present exemplary embodiment. In the scanning optical device 401 of the present exemplary embodiment illustrated in FIG. 9, the aperture diaphragm 204 included in the scanning optical device 101 of the first exemplary embodiment is removed, and in place of the aperture diaphragm 204, an opening portion 402 which makes the laser light L pass through the opening portion 402 to limit a width of the laser light L to a predetermined width is formed on a deformation regulation portion 12. In other words, in the present exemplary embodiment, the deformation regulation portion 12 also has a function of the aperture diaphragm 204 according to the first exemplary embodiment.

As described above, by limiting the width of the laser light L to a predetermined width with use of the opening portion 402 of the deformation regulation portion 12, a number of components can be reduced and material cost or manufacturing cost of the scanning optical device 401 can be reduced.

Further, in the configuration described in the first and the second exemplary embodiments, the bearing shaft sleeve 5 is supported by the substrate 4, and the shaft 8 is configured integrally with the rotor 7. However, the present disclosure is not limited thereto, and the same effect can be acquired in a configuration of a fixed-shaft type in which the shaft 8 is supported by the substrate 4, and the bearing shaft sleeve 5 is configured integrally with the rotor 7.

According to an aspect of the present disclosure, in the scanning optical device, a risk of the slipping of a rotor in a rotational axis direction can be reduced compared with a conventional configuration.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-184728, filed Sep. 26, 2017, which is hereby incorporated by reference herein in its entirety.

What is claimed is:

1. A scanning optical device comprising:
   a light source device;
   a rotational polygon mirror which rotates to deflect laser light, emitted from the light source device;
   a rotor which holds the rotational polygon mirror and rotates together with the rotational polygon mirror;
   a stator which rotates the rotor, the stator includes a coil for rotating the rotor;
   a substrate for holding the coil, the substrate includes a first regulation portion arranged so as to overlap with a portion of the rotor in a rotational axis direction of the rotor, and in a case where the rotor is caused to move in the rotational axis direction, a movement of the rotor in the rotational axis direction is regulated when the rotor comes into contact with the first regulation portion; and
   a second regulation portion arranged in a position in relation with the first regulation portion so as to maintain the first regulation portion in a position where the first regulation portion overlaps with the portion of the rotor in the rotational axis direction, so as to regulate deformation of the first regulation portion, wherein the first regulation portion includes a first bending portion and a second bending portion further bent from the first bending portion, and wherein the second bending portion is bent at an angle smaller than an angle at which the first bending portion is bent.

2. The scanning optical device according to claim 1, wherein in a case where the first regulation portion is deformed so as to be in contact with the second regulation portion, the first regulation portion continues to partially overlap with the portion of the rotor in the rotational axis direction of the rotor.

3. The scanning optical device according to claim 1, wherein the second regulation portion is in contact with the first regulation portion so that the first regulation portion is not deformed.

4. The scanning optical device according to claim 1, wherein the first bending portion is bent to make the second bending portion to be arranged on an opposite side of the substrate with respect to a part of the rotor when viewed in a direction perpendicular to the rotational axis direction of the rotor.

5. The scanning optical device according to claim 1, wherein the rotor includes a flange portion, and wherein the first regulation portion is arranged at a position where the first regulation portion overlaps with the flange portion in the rotational axis direction.

6. The scanning optical device according to claim 1 further comprising:

a shaft as a rotational axis of the rotor; and a bearing shaft that rotatably supports the shaft, wherein the shaft is freely fit into the bearing shaft at a shaft end portion that is on a side opposite to a side the first regulation portion regulates movement of the rotor.

7. The scanning optical device according to claim 1, wherein the second regulation portion is arranged on a side opposite to a side the rotational shaft of the rotor is arranged with respect to the first regulation portion.

8. The scanning optical device according to claim 1, wherein the substrate is a metallic plate.

9. The scanning optical device according to claim 1, wherein the second regulation portion has an opening portion which allows laser light emitted from the light source to pass through and limits a width of the laser light to a predetermined width.

10. The scanning optical device according to claim 1, wherein the second regulation portion is arranged on a housing of the scanning optical device.

11. An image forming apparatus comprising:

an image bearing member; and the scanning optical device according to claim 1 which scans the image bearing member with laser light to form an electrostatic latent image.

12. A scanning optical device comprising:

a light source device;

a rotational polygon mirror which rotates to deflect laser light emitted from the light source device;

a rotor which holds the rotational polygon mirror and rotates together with the rotational polygon mirror;

a stator which rotates the rotor, the stator includes a coil for rotating the rotor;

a substrate for holding the coil, the substrate includes a first regulation portion arranged so as to overlap with a portion of the rotor in a rotational axis direction of the rotor, and in a case where the rotor is caused to move in the rotational axis direction, a movement of the rotor in the rotational axis direction is regulated when the rotor comes into contact with the first regulation portion; and a second regulation portion configured to regulate deformation of the first regulation portion in a positional relationship in which a part of the rotor is positioned between the first regulation portion and the substrate when viewed in a direction perpendicular to the rotational axis direction of the rotor, wherein the first regulation portion includes a first bending portion and a second bending portion further bent from the first bending portion, and wherein the second bending portion is bent at an angle smaller than an angle at which the first bending portion is bent.

* * * * *